Aug. 7, 1928.　　　　　　　　　　　　　　　1,679,367
W. MEYSENBURG
BRAKING DEVICE AND METHOD OF CAUSING BRAKING EFFECT
Filed Nov. 16, 1922

Inventor
Wilhem Meysenburg
By
Otto K. Zwingenberger
His Attorney

Patented Aug. 7, 1928.

1,679,367

UNITED STATES PATENT OFFICE.

WILHELM MEYSENBURG, OF NEW YORK, N. Y.

BRAKING DEVICE AND METHOD OF CAUSING BRAKING EFFECT.

Application filed November 16, 1922, Serial No. 601,418, and in Germany December 8, 1921.

This invention relates to braking devices and it particularly relates to braking devices for vehicles driven by power derived from explosion engines, the object of the invention being to provide means allowing to operate the brake most effectively.

It is an object of the invention to provide means by which the braking effect upon the vehicle is accomplished by means of air, the elasticity of an air cushion causing the braking effect to take place without shocks, neither when putting on the brake, nor when starting the motor again.

Another object of the invention is to provide means which will allow to immediately put on the brake at any time when necessary during the operation of the car.

It is a further object of the invention to provide means which will allow the regulation of the operation of the braking device within very wide limits in an easy and efficient manner.

It is also an object of the invention to provide means which will allow the operation of the braking device without operating the clutches.

Figure 1:
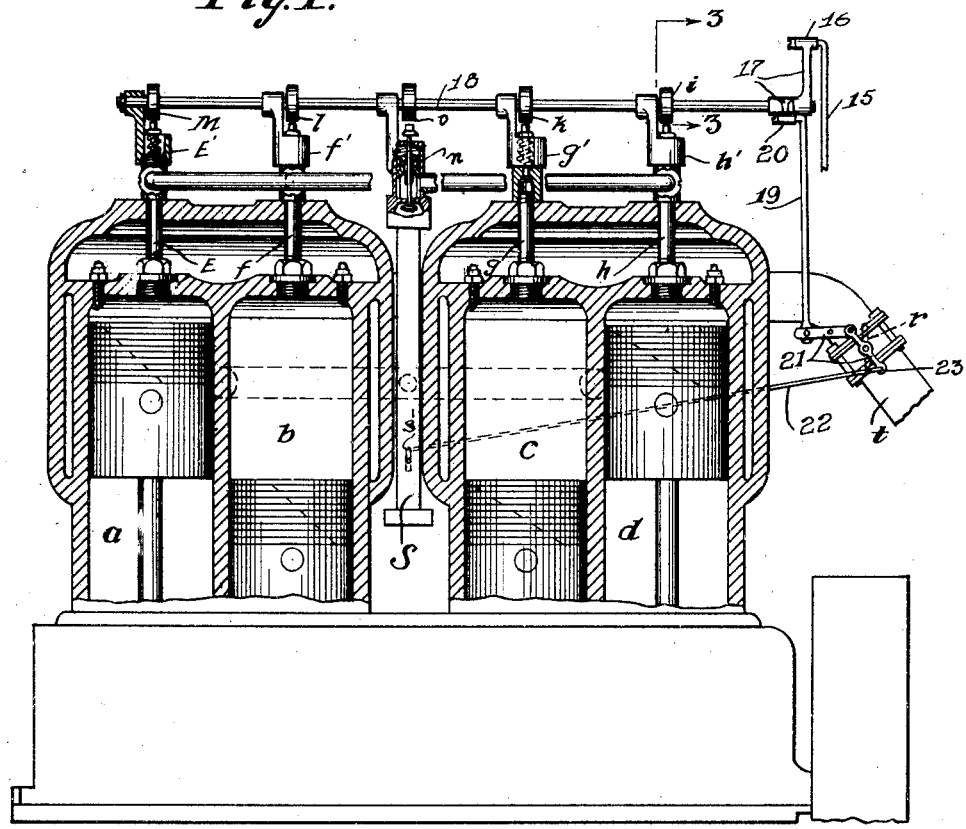
Figure 2:
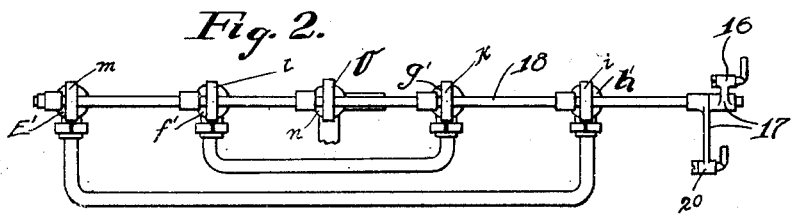
Figure 3:
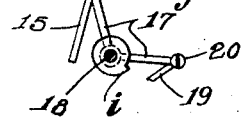
Figure 4:
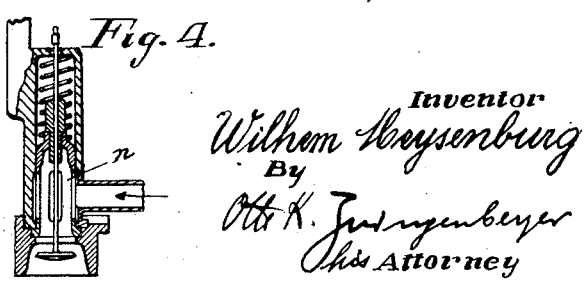

These and other objects will be more particularly pointed out hereinafter in the description and the claims in which I describe my invention, by way of example, in connection with a vertical four cylinder motor of the four cycle type, reference being had to the accompanying drawing in which I illustrate my new braking device, the Figure 1 showing a vertical longitudinal section through such a four cylinder four cycle type motor, provided with the braking device; Figure 2 is a top view of the braking device as mounted on top of the cylinders of the motor; Figure 3 is a side view on line 3—3 of Figure 1 showing a cam such as constituting a part of the braking device; and Fig. 4 is a vertical sectional view of the spring actuated valve operatively connected with the intake pipe of the motor for the admission of air into the cylinders of the motor.

There are already methods for producing a braking effect upon vehicles driven by explosive power in which the multiple explosion motor is caused to work as a compressor and in which the air, entered into the cylinders, is continuously more and more compressed within the space of the cylinders closed by valves; the air thus compressed in one cylinder is then during the next cycle either passed through the intake pipe and the inlet valve into another cylinder just filled with fresh air, or the air, admitted into one or more low pressure cylinders, is pressed into a closed space or chamber and passed from same into one or several high pressure cylinders where it is highly compressed and during the next cycle is pressed into the closed chamber. These two methods causing a braking effect by the air as well as others operated by means of explosion motors have the disadvantage that the change of the explosion motor into a compressor requires the arrangement of the cam-shaft in its bearings in such manner that it is slidable along its longitudinal axis; furthermore there must be more cams on this shaft than is necessary for regular running. These methods also render it necessary to supply the motor with a safety valve so as to guard against too high pressures.

All these disadvantages are avoided by my new braking device and the method of operating the same, the explosion motor being turned into a compressor without any interference with the sensitive valve operating mechanism of the explosion engine by connecting the combustion chambers of the cylinders, in which the pistons strike in the same direction, i. e. move in unison, by pipes or other air conducting means, with regulating valves, or other suitable means, interposed at certain points. I do not need any safety valves against too high a pressure within the cylinders as the outlet valves of the explosion motor act as safety valves for in case of excessive compression within the closed chamber the pressure upon the lower side of the outlet valve will overcome the elasticity of the springs and open the valves until the pressure is equalized.

In the following I am going to describe the principle only of how I cause the braking effect with the means to accomplish this purpose; the other feature of how to accomplish this effect in one mechanical operation from the seat of the driver by simply pulling downwardly a lever and to transfer this motion upon the various elements of the braking device, forming the subject matter of this application, can be carried out in many different ways of which one way is described further below.

In the drawing, Figure 1, $a$, $b$, $c$ and $d$ denote the four cylinders of the explosion motor, the same being of the four cycle type;

the pistons run in the same direction within cylinders $a$ and $d$ and likewise in $b$ and $c$. The cylinders in each of these sets $a$, $d$ and $b$, $c$ are connected with each other by suitable air conducting means, such as pipes $p$ and $q$, respectively. The connections between these pipes and the combustion chambers of the cylinders are made by the short nipples $e$, $f$, $g$ and $h$ which are provided preferably at the upper end, where they are joined to the pipes $p$ and $q$, respectively, with the throttling valves $e'$, $f'$, $g'$ and $h'$, respectively, their stems being actuated by springs to open the valves when depressed for instance by the cams $m$, $l$, $k$ and $i$, respectively secured to the shaft 18 operatively connected with the lever 15. The gas mixture is supplied by the intake pipe $s$, which in turn can be shut off by a plate valve $s'$; a spring actuated plate valve $n$, operated by a cam $o$ on shaft 18 and communicating with the outside air, is connected with its outlet pipe to the intake pipe $s$ so as to admit air into the same and from there into the cylinders, when the valve $n$ is open and the plate valve $s'$ is closed. The exhaust pipe $t$, with which all cylinders are connected, is closed by a plate valve $r$ and the pressure within the exhaust pipe can be modified as the plate valve $r$ can be adjusted in its position. It is understood that the four cylinders are arranged to have their power stroke or explosions take place in the order $a$, $c$, $d$ and $b$.

Nothing is changed at all in the valve operating mechanism when the motor is operated as a brake. An inspection of the Figure 1 shows that a rod 15 hingedly connects the upper end 16 of the double arm lever 17 secured to the shaft 18 rotatably arranged in journals upwardly projecting from and being integral with each of the throttling valves $e'$, $f'$, $g'$ and $h'$; a rod 19 hingedly connects the end 20 of the aforesaid double arm with the upper end of another double arm lever 21 secured to the outer end of the horizontal axis of the plate valve $r$. Finally a rod 22 hingedly connects both the lower end 23 of the arm 21 and the plate valves $s'$ in the intake pipe $s$. It is obvious that a downward movement of the lever 15 rotates the shaft 18 far enough so as to pass the cams $m$, $l$, $k$, and $i$ on the stems of the throttling valves $e'$, $f'$, $g'$ and $h'$, respectively, and likewise cam $o$ on the stem of the valve $n$, thereby opening all the aforesaid valves; simultaneously plate valves $r$ and $s'$ are closed. Now the gas mixture is shut off and air is admitted through the valve $n$ into the upper part of the intake pipe $s$, from where it passes in the further course of the operation into and through the various cylinders into the closed exhaust pipe to be compressed there. By the upward stroke of the pistons in the cylinders $a$ and $d$ the air within these cylinders is pressed through the pipe $p$ and through the open outlet valve of the cylinder $d$ into the exhaust pipe $t$, which is closed by means of plate valve $r$, or into an extension chamber (not shown) attached to and communicating with said exhaust pipe $t$. During this time the pistons of the cylinders $b$ and $c$ were striking downwardly thereby sucking air through the intake pipe $s$, now communicating with the air, and through the open inlet valve of cylinder $c$.

At the end of the cycle or immediately afterwards, at the beginning of the next cycle the outlet valve of the cylinder $d$ is closed and its inlet valve is opened, the pressure of the air compressed within the dead space of cylinders $d$ and $a$ and within the pipe $p$ being thereby reduced to atmospheric pressure, whereupon the pistons of the cylinders $d$ and $a$, continuing to strike downwardly, suck in air through the open inlet valve of the cylinder $d$ and through the pipe $p$, the air being admitted by the open puppet-valve $n$ into the upper branch of the intake pipe $s$. These operations are repeated in the manner described with each half revolution of the motor inasmuch as always simultaneously in a pair of cylinders, as for instance cylinders $a$, $d$ and $b$, $c$, having pistons striking in the same direction, air is once sucked in and once compressed. It is obvious that in this method of accomplishing a braking effect there is no compressed air which by expanding could exert any power upon the downwardly striking pistons thereby counteracting the braking effect as at the moment of changing from one cycle to the next one the air within the cylinders, above the pistons, is put in connection with the atmosphere by the respective inlet valve which opens at that particular moment. The maximum pressure of the compressed air in the closed exhaust pipe is automatically regulated by the spring actuated outlet valve.

In order to regulate the air pressure in the exhaust pipe $t$ or in the extension chamber attached to and communicating with same, and to thus modify the braking effect, the plate valve $r$ in the exhaust pipe $t$ can be regulated in its position and according to requirements it can be adjusted by hand.

The normal work of the motors is restored by releasing the rod 15; as soon as this is done the cams $m$, $l$, $k$ and $i$ are taken off the piston stems of valves $e'$, $f'$, $n$, $g'$, and $h'$ and the valves are closed; simultaneously the inlet pipe $s$ is opened to admit the explosive gas mixture and the pipe $t$ is open again for the exhaust of the burned gases.

It is of course understood that the braking effect described above can also be applied to other types of explosion motors, for instance to six-cycle motors; furthermore there is no limit to the number of cylinders of which the combustion chambers, having pistons striking in the same direction, are connected by pipes in the way described. These connections may be effected also by other similar means, as for instance channels arranged in the casting of the cylinder; the throttling devices $e'$, $f'$, $g'$ and $h'$ at the upper end of the connection nipples $e$, $f$, $g$ and $h$ respectively, as well as in the exhaust pipe $t$, the plate valve $r$, can be substituted by any convenient means, as for instance cocks, plate valves, pistons, or the like; also the puppet valve $n$ can be substituted by any other convenient equivalent.

The essential point of the invention lies in connecting by regulatable air conductors the combustion chambers of the motor cylinders, having the pistons strike in the same direction; in closing the exhaust pipe by a regulatable member; in establishing communication of the combustion chambers of the cylinders with the atmosphere by introducing a suitable valve into the intake pipe, which steps turn the motor into a compressor without interference with the valve regulating mechanism, so that simultaneously with one cycle the pistons of one group of cylinders suck in air and those of the other group of cylinders press the air into the closed exhaust pipe.

What I claim is:

1. The method of causing a braking effect upon a vehicle, driven by a multiple explosion motor, by turning said motor into a compressor, said method consisting in closing the exhaust pipe of the motor, putting the combustion chambers of each group of cylinders, the pistons of which move in unison, into communication with each other, and admitting air only into said combustion chambers by connecting the intake pipe for the gas supply with the atmospheric air.

2. The method of causing a braking effect upon a vehicle, driven by a multiple explosion motor, by turning said motor into a compressor, said method consisting in throttling the exhaust pipe of the motor, putting the combustion chambers of each group of cylinders, the pistons of which move in unison, into communication with each other, and admitting air only into said combustion chambers by connecting the intake pipe for the gas supply with the atmospheric air.

3. The method of causing a braking effect upon a vehicle, driven by a multiple explosion motor, by turning said motor into a compressor, said method consisting in closing the exhaust pipe of the motor, putting the combustion chambers of each group of cylinders, the pistons of which move in unison, into communication with each other, admitting air only into said combustion chambers by connecting the intake pipe for the gas supply with the atmospheric air, pressing air by the pistons of one group of cylinders into the closed exhaust pipe, and sucking in air during the same cycle by the pistons of the other group of cylinders.

4. The method of causing a braking effect upon a vehicle driven by a multiple explosion motor, by turning said motor into a compressor, said method consisting in closing the exhaust pipe of said motor, putting the combustion chambers of each group of cylinders, the pistons of which move in unison, into regulatable communication with each other, and admitting air only into said combustion chambers by connecting the intake pipe for the gas supply with the atmospheric air.

5. The method of causing a braking effect upon a vehicle driven by a multiple explosion motor, by turning said motor into a compressor, said method consisting in closing the exhaust pipe of the motor, putting the combustion chambers of each group of cylinders, the pistons of which move in unison, into communication with each other, admitting air only into said combustion chambers by connecting the intake pipe for the gas supply with the atmospheric air, pressing air by the pistons of one group of cylinders through their connection pipe and the open outlet valve of one of the cylinders into the closed exhaust pipe, sucking in air during the same cycle by the pistons of the other group of cylinders through the intake pipe connected with the atmosphere and through the open inlet valve of one of these cylinders, and alternately repeating these compression and sucking operations.

6. The method of causing a braking effect upon a vehicle, driven by a multiple explosion motor, by turning said motor into a compressor, said method comprising pressing air from within the combustion chambers of a group of cylinders, communicating with each other and having their pistons move in unison, through their common passageway and the open outlet of the cylinders into the closed exhaust pipe, and timing this compression so as to have the exhaust valve close at substantially the end of this compression stroke.

7. The method of causing a braking effect upon a vehicle, driven by a multiple explosion motor, by turning said motor into a compressor, said method comprising taking in air through a common entrance pipe into a plurality of cylinders each of which has an individual exit, closing the exhaust pipe of the motor, compressing the air simultaneously within said plurality of cylinders, and discharging the compressed air from the said cylinders simultaneously through one of said exits into the closed exhaust pipe.

8. In an air braking device for vehicles driven by a multiple explosion motor, in connection with the cylinders of said motor, the combination of air passageways for communicating with each other the combustion chambers of each group of cylinders having the pistons move in unison during a cycle, means within the intake pipe shutting off the gas supply and admitting air instead into the combustion chambers of the cylinders, and means closing the exhaust pipe of the motor.

9. In an air braking device for vehicles driven by a multiple explosion motor, in connection with the cylinders of said motor, the combination of air passageways for communicating with each other the combustion chambers of each group of cylinders having the pistons move in unison during a cycle, means within the intake pipe shutting off the gas supply and admitting air instead into the combustion chambers of the cylinders, and of adjustable means closing the exhaust pipe of the motor.

10. In an air braking device for vehicles driven by a multiple explosion motor, in connection with the cylinders of said motor, the combination of air passageways for communicating with each other the combustion chambers of each group of cylinders having the pistons move in unison during a cycle, means within aforesaid passageways regulating the flow of air within same, means within the intake pipe shutting off the gas supply and admitting air instead into the combustion chambers, and means closing the exhaust pipe of the motor.

11. In an air braking device for vehicles driven by a multiple explosion motor, in connection with the cylinders of said motor, the combination of air passageways for communicating with each other the combustion chambers of each group of cylinders having the pistons move in unison, means within aforesaid passageways regulating the flow of air through the same, means within the intake pipe shutting off the gas supply and admitting air instead into the combustion chambers of the cylinders of the motor.

12. In air braking device for vehicles driven by a multiple explosion motor, adapted to be changed into a compressor, said device comprising passageways putting each group of cylinders, having the piston move in unison during the same period of a cycle, into communication with each other.

13. An air braking device for vehicles driven by a multiple explosion motor adapted to be changed into a compressor, said device comprising regulatable air passageways putting each group of cylinders, having the piston move in unison during the same period of the cycle, into communication with each other.

In testimony whereof, I have signed my name to this specification, this 3d day of November, 1922.

WILHELM MEYSENBURG.